(12) United States Patent
Grehant

(10) Patent No.: US 7,948,195 B2
(45) Date of Patent: May 24, 2011

(54) METHOD OF CONTROLLING A ROLLER BLIND ACTUATOR

(75) Inventor: Bernard Grehant, Nancy-sur-Cluses (FR)

(73) Assignee: Somfy SAS, Cluses (FR)

( * ) Notice: Subject to any disclaimer, the term of this patent is extended or adjusted under 35 U.S.C. 154(b) by 494 days.

(21) Appl. No.: 12/090,794

(22) PCT Filed: Oct. 18, 2006

(86) PCT No.: PCT/IB2006/002908
§ 371 (c)(1),
(2), (4) Date: Apr. 18, 2008

(87) PCT Pub. No.: WO2007/045967
PCT Pub. Date: Apr. 26, 2007

(65) Prior Publication Data
US 2008/0290823 A1 Nov. 27, 2008

(30) Foreign Application Priority Data

Oct. 19, 2005 (FR) .................................... 05 10646
Mar. 13, 2006 (FR) .................................... 06 02169

(51) Int. Cl.
*H02P 3/00* (2006.01)
(52) U.S. Cl. ...................... 318/466; 318/280; 160/166.1; 160/176.1 P
(58) Field of Classification Search .................. 318/466, 318/468, 280, 283, 282; 160/166.1, 168.1 P, 160/176.1 P, 238, 253, 291, 293, 309–311
See application file for complete search history.

(56) References Cited

U.S. PATENT DOCUMENTS

| | | | | | |
|---|---|---|---|---|---|
| 3,310,099 | A | * | 3/1967 | Hunter et al. | 160/171 |
| 4,706,726 | A | * | 11/1987 | Nortoft | 160/168.1 P |
| 4,902,953 | A | * | 2/1990 | Kraft et al. | 318/663 |
| 4,956,588 | A | * | 9/1990 | Ming | 318/16 |
| 4,995,442 | A | * | 2/1991 | Marzec | 160/331 |
| 5,402,047 | A | * | 3/1995 | Bresson et al. | 318/287 |
| 5,808,430 | A | * | 9/1998 | Ho | 318/266 |
| 5,818,183 | A | * | 10/1998 | Lambert et al. | 318/286 |
| 5,909,093 | A | * | 6/1999 | van Dinteren et al. | 318/16 |

FOREIGN PATENT DOCUMENTS

| | | |
|---|---|---|
| EP | 0 038 877 A | 11/1981 |
| FR | 2 550 356 A | 2/1985 |
| WO | WO 2004/025867 | 3/2004 |
| WO | WO 2005/031963 | 4/2005 |

* cited by examiner

*Primary Examiner* — Rina I Duda
(74) *Attorney, Agent, or Firm* — Frommer Lawrence & Haug LLP; Ronald R. Santucci

(57) ABSTRACT

A method of controlling an electromechanical actuator (ACT) comprising a motor (MOT) for maneuvering a mobile appliance (LD) of a building in a first direction (DIR1) and in a second direction (DIR2) by way of a remote-control unit (RCU) and a unit (MCU) for driving the motor that are placed respectively one upstream of the other on an electrical power line energizing the motor with an alternating voltage, a command to maneuver in the first direction comprising a half-wave rectified signal of positive polarity and a command to maneuver in the second direction comprising a half-wave rectified signal of negative polarity, wherein the maneuver commands furthermore comprise an alternating voltage signal following the half-wave rectified signal.

12 Claims, 3 Drawing Sheets

METHOD OF CONTROLLING A ROLLER BLIND ACTUATOR

CROSS-REFERENCE TO RELATED APPLICATIONS

This application is a 371 of PCT/IB2006/002908 filed on Oct. 18, 2006, published on Apr. 26, 2007 under publication number WO 2007/045967 A1 which claims priority benefits from French Patent Application Number 05 10646 filed Oct. 19, 2005 and French Patent Application Number 06 02169 filed Mar. 13, 2006, the disclosure of each are incorporated herein by reference.

BACKGROUND OF THE INVENTION

The invention relates to a method of controlling an electromechanical actuator. It relates further to a method of shaping an alternating voltage, an actuator for maneuvering a mobile appliance of a building in a first direction and in a second direction, comprising a motor drive unit and a motor and installations for implementing the methods.

Single-phase asynchronous motors are commonly integrated within the actuators used for comfort and/or security applications in a building, such as for example the operating of shutters, roller blinds, ventilation flaps or closures.

Patent application WO2004/025867 describes more particularly a method relating to actuators capable of operating a mobile element in two directions of rotation and comprising two power supply terminals. A control to move in a first direction (for example up) is transmitted by cutting off the negative half-waves while a control to move in a second direction is transmitted by cutting off the negative half-waves. A stop control is obtained by cutting off the supply voltage completely for a duration lying in a determined time interval.

This method and the means presented for its implementation comprise several drawbacks. Implementation requires special switches for generating a stop control. The special switch comprises a third contact, for example normally closed, or comprises a mechanical means allowing simultaneous pressing of the two movement control contacts. Moreover, during the transmission of a movement control command, if the user maintains his action on the contact, the motor is firstly powered under reduced effective voltage and consequently might not deliver sufficient torque to allow the motor to start. Thereafter, the permanent powering of the actuator takes no account of the energy economy requirements. Furthermore, the installation using the method is not secure against an outside intrusion attempt or against the glitches that may arise on the power supply line. Finally, insofar as it is necessary that the electronics downstream of the switch be always powered, a movement stop command consisting of opening the line can only be transmitted for a very reduced duration. In the event of fleeting failure of the reception means, it is possible that this stop command may not be received. This is a serious security problem.

Another major drawback of the prior art is that it requires that the diodes contained in the special switches be dimensioned as a function of the rating of the current absorbed by the motor. In particular, it is almost impossible for several motors supplied by one and the same switch to be placed in parallel unless said diodes are overdimensioned. In the case of a general control switch, placed upstream of the installation, the nominal rating of the diodes becomes considerable: specifically, a motor used in the applications cited absorbs a typical current of 1 A, this corresponding to a very cheap standard diode 1N4007, while an installation of 20 motors will require bulky and expensive 20 A diodes.

BRIEF SUMMARY OF THE INVENTION

The aim of the invention is to provide a control method and means remedying these drawbacks and improving the control methods and the means known from the prior art. In particular, the control method makes it possible to control an actuator by virtue of two control buttons, to ensure that the motor is energized under nominal voltage right from the start of execution of a movement order, to limit the electrical energy consumption and to secure the actuator against an outside intrusion attempt or against the glitches that may arise on the power supply line and to emit a redundant stop control signal.

The control method according to an embodiment of the invention includes a command to maneuver in a first direction which comprises an alternating voltage signal following a half-wave rectified signal.

According to another embodiment of the invention, the maneuver command comprises a half-wave rectified signal in which at least five alternations of like sign of the alternating voltage have been cut off. In other embodiments, a stop command comprises a half-wave rectified signal, whatever the polarity of the signal is.

In other embodiments, electronic circuits (PSU1, CPU, TCU) for managing the power supply to the motor are activated as soon as a half-wave rectified signal is detected and may be deactivated as soon as a stop order is executed.

In other embodiments of the invention, the half-wave rectified signal comprises a voltage half-period equal to the nominal voltage and a reduced voltage half-period.

In the inventive method, a complete period, or a succession of complete periods, of reduced voltage is interpreted as a command to maneuver the mobile appliance (LD) towards a predefined intermediate position if the motor has stopped.

According to an embodiment of the invention, an actuator for maneuvering a mobile appliance (LD) of a building in a first direction (DIR1) and in a second direction (DIR2), comprising a unit (MCU) for driving a motor and a motor (MOT), comprises hardware means (PSU0, CIU, TCU) and software for implementing a stop command that comprises a half-wave rectified signal, regardless of the polarity of the signal.

An installation according to another embodiment of the invention comprises an actuator as recited above and a remote control unit (RCU) comprising two normally close switches (SW1, SW2) mounted in series and two diodes (D1 and D2) mounted in parallel with the switches. In some embodiments, the remote control unit comprises a capacitor disposed across the terminals of the assembly of the two switches mounted in series.

Another embodiment of an installation according to this invention comprises a voltage monitoring and voltage shaping unit (GCU) to monitor the presence of the alternations of an alternating voltage and, when a first alternation is absent, to remove the alternation immediately following the first alternation. In some embodiments, the voltage monitoring and shaping unit comprises a voltage measurement module (VMU), two normally closed controlled switches (TR3, TR4) mounted in series and two diodes (D3, D4) mounted in parallel with the switches, two electrodes of like nature of the diodes being linked to the common terminal of the switches and a unit (MU) to control the switches as a function of the voltage measurement module.

Some embodiments of the invention, include a method for shaping an alternating voltage wherein the presence of the alterations of the alternating voltage is monitored and in that, when a first alteration is absent, the alteration immediately following the first alteration is removed. In some embodiments, the method for shaping an alternating voltage is implemented by a voltage monitoring and shaping unit (GCU). In some embodiments, the voltage monitoring and shaping unit comprises a voltage measurement module (VMU), two normally closed control switches (TR3, TR4) mounted in series and two diodes (D3, D4) mounted in parallel with the switches, two electrodes of like nature of the diodes being linked to the common terminal of the switches and a unit (MU) to control the switches as a function of the voltage measured by the voltage measurement module.

According to an embodiment of the invention, an installation (INST) comprising a voltage monitoring and voltage shaping unit (GCU) may furthermore comprise, downstream of the monitoring unit, at least one electromechanical actuator (ACT) comprising a motor (MOT) for maneuvering a mobile appliance (LD) of a building in a first direction (DIR1) and in a second direction (DIR2) by way of a remote-control unit (RCU) and a unit (MCU) for driving the motor that are placed respectively one upstream of the other on an electrical power line energizing the motor with an alternating voltage, a command to maneuver in the first direction comprising a half-wave rectified signal of positive polarity and a command to maneuver in the second direction comprising a half-wave rectified signal of negative polarity.

The appended drawing represents, by way of examples, a mode of execution of the control method according to the invention, a mode of execution of the shaping method according to the invention and an embodiment of an actuator and of an installation according to the invention.

Figure 1:
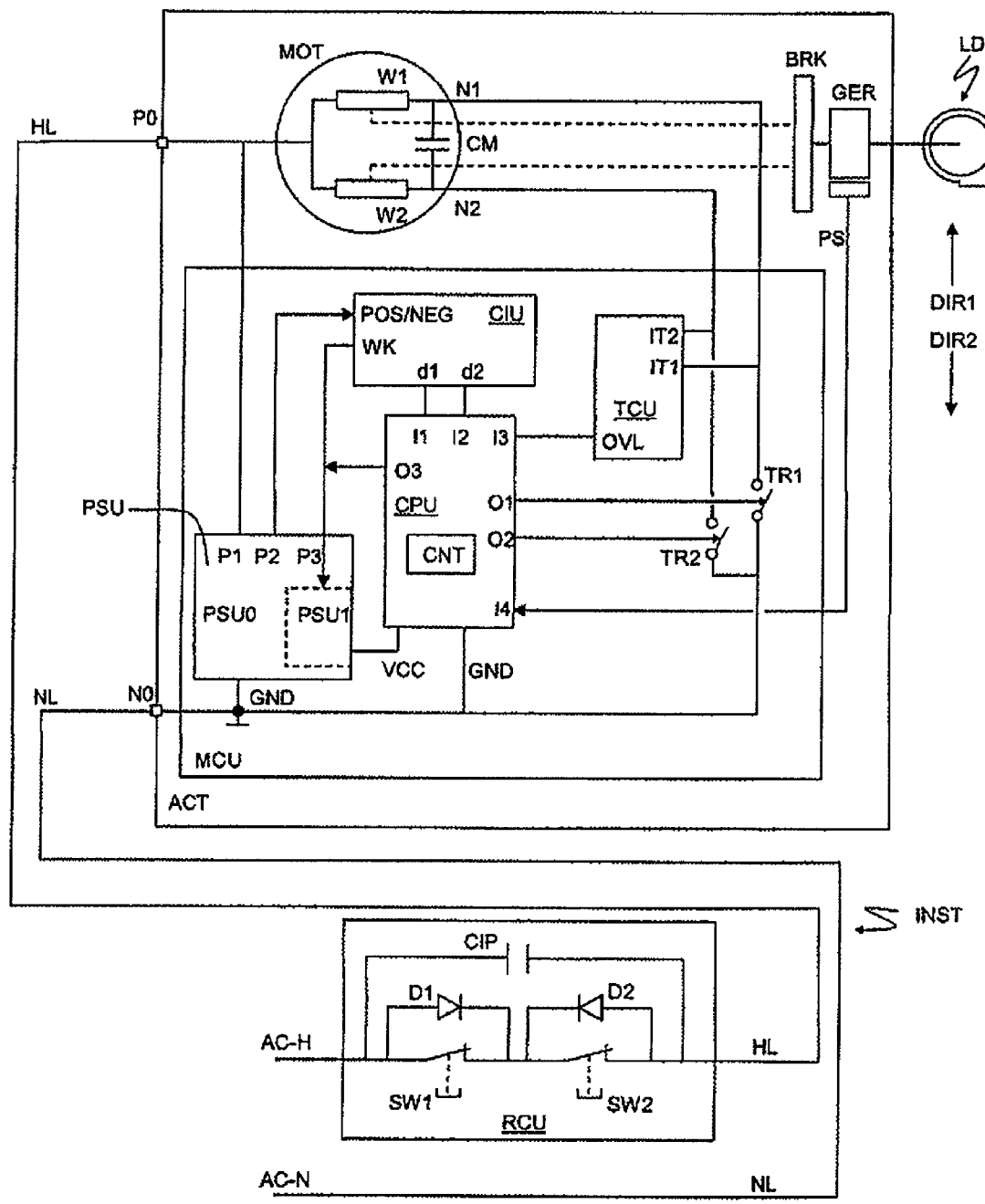
FIG. 1 is a diagram of an embodiment of an installation according to the invention.

The installation INST described in FIG. 1 allows the maneuvering of a load LD in a first direction of movement DIR1 and in a second direction of movement DIR2. The installation comprises an actuator ACT operating the load and a unit RCU for remote control of this actuator, the actuator being supplied by the electrical network through the remote-control unit.

The electrical power supply network of the installation is connected to a phase lead AC-H from the electrical distribution board of the building and to a neutral lead AC-N also from this board. There is a direct link NL between the neutral lead AC-N and a neutral terminal N0 of the actuator. The link between the phase lead AC-H and the phase terminal P0 of the actuator is effected by way of the remote-control unit RCU, an input of which is connected to the phase lead while an output of which is connected to the actuator by a phase link HL.

The remote-control unit RCU comprises a first normally closed switch SW1 in series with a second normally closed switch SW2. A first diode D1 and a second diode D2 are disposed respectively in parallel with each of the switches, the cathodes being linked to the common point of the switches. A pulse on the pushbutton activating the first switch SW1 therefore causes the disappearance of the negative half-waves, while a pulse on the pushbutton activating the second switch SW2 causes the disappearance of the positive half-waves.

The actuator ACT comprises a motor MOT of single-phase induction type with permanent capacitor. The motor MOT comprises a first winding W1 and a second winding W2. The two windings have a common point connected to the phase terminal P0. The non-common ends of the windings are designated respectively by N1 and N2. A permanent capacitor CM is disposed between these ends. When the first end N1 is connected to the neutral terminal N0, then the motor rotates in a first direction. When the second end N2 is connected to the neutral terminal N0, then the motor rotates in a second direction. The output shaft of the motor is connected to an immobilization brake BRK, of the no current type: the rotation is disabled if the windings are not energized. A reduction gear GER makes it possible to reduce the rotation frequency while increasing the torque. The output shaft of the reduction gear operates the load in a first direction DIR1 if the motor rotates in the first direction and in a second direction DIR2 if the motor rotates in the second direction.

The actuator comprises a motor drive unit MCU comprising two controlled switches. A first controlled switch TR1 is linked to the first end N1 of the winding W1 of the motor and to the neutral terminal N0. A second controlled switch TR2 is linked to the second end N2 of the winding W2 and to the neutral terminal N0. The closing of one or the other of the controlled switches therefore allows the energizing of the motor. The controlled switches are triacs, also allowing a link synchronized with the mains voltage and phase-angle control. Alternatively, the controlled switches can be relay contacts. Other types of semiconductor switches of MOS or GTO type are also usable.

The motor drive unit also comprises a processing logic unit CPU, of which two logic inputs I1 and I2 receive the commands to move in the first or the second direction. A third logic input I3 of the processing logic unit is connected to a logic output OVL of a torque control unit TCU. The torque control unit has a first input IT1 connected to the first end N1 and a second input connected to the second end N2. This unit therefore has access to the voltage at the terminals of the permanent capacitor CM. This voltage is representative of the rotor speed, itself dependent on the torque. Alternatively, the torque control unit TCU can also have a link with the neutral terminal N0. The torque is then deduced from the voltages referenced with respect to the neutral.

The processing logic unit also comprises a first logic output O1 connected to the control terminal of the first controlled switch TR1 and a second logic output O2 connected likewise to the second controlled switch TR2.

When the torque control unit detects that the torque exceeds a predetermined threshold, and/or that the torque variation exceeds a predetermined threshold, then the logic output OVL becomes active. The information received on the logic input I3 allows the processing logic unit CPU to control the opening of the controlled switches.

A fourth logic input I4 of the processing logic unit is connected to the output PS of a position sensor. This sensor is disposed on the output shaft of the motor, or else on one of the components of the reduction gear. The pulses transmitted by the position sensor allow the incrementation or the decrementation of a counter CNT of the processing logic unit.

The motor drive unit comprises a power supply unit PSU having a first input terminal P1 connected to the phase terminal P0 and a second input terminal GND connected to the neutral terminal N0. This terminal serves as electrical ground for the circuits contained in the motor drive unit MCU. The power supply unit comprises rectifier and step-down circuits that are not represented as they are known to the person skilled in the art. The power supply unit PSU also comprises a positive output VCC connected to the power supply terminal of the processing logic unit CPU. The voltage delivered between this positive output and the ground GND equals for example 5 volts. However, a voltage does not systematically appear on the positive output VCC as soon as the actuator is energized.

Specifically, the motor drive unit also comprises a command interpretation unit CIU of which a wakeup logic output WK is connected to a third input terminal P3 of the power supply unit.

The power supply unit PSU is in fact organized as two sub-assemblies. A first sub-assembly PSU0 comprises in particular a diode rectifier bridge, equipped with current sensors. The current sensors make it possible to differentiate a positive half-wave and a negative half-wave of the voltage applied to the actuator. The sub-assembly comprises a half-wave information output P2 connected to a half-wave information input POS/NEG of the command interpretation unit CIU. The latter has a first movement logic output d1, and a second movement logic output d2. These two outputs are respectively connected to the logic inputs I1 and I2 of the processing logic unit CPU. The first sub-assembly PSU0 is intended to supply solely the command interpretation unit CIU.

The manner of operation of this interpretation unit is as follows:
- if a positive half-wave is inserted between two negative half-waves or if a negative half-wave is inserted between two positive half-waves, then the movement logic outputs are not modified,
- if a positive half-wave is missing between two negative half-waves, then the wakeup logic output WK is activated and thereafter the first movement logic output d1 is activated,
- if a negative half-wave is missing between two positive half-waves, then the wakeup logic output WK is activated and thereafter the second movement logic output d2 is activated.

The second sub-assembly PSU1 comprises the power dissipation elements, for example the MOS transistors for chopping the input voltage, which allow the generation of the reduced voltage on the positive output VCC. This voltage energizes the processing logic unit CPU and the torque control unit. The wakeup input P3 is connected directly to the second sub-assembly, and allows the activation thereof when the wakeup signal WK becomes active. Thus, although the actuator is normally energized permanently, its consumption is reduced to the strict minimum so long as there has been no disappearance of at least one positive half-wave or one negative half-wave.

It should be noted that the sub-assemblies PSU0 and PSU1 both comprise capacitors of sufficient capacitance to allow power to be supplied to the electronic circuits CPU, TCU, CIU at least when the supply voltage is cut off during a half-period. Alternatively, it is the electronic circuits CPU, TCU, CIU which have these capacitors.

The processing logic unit CPU comprises a third logic output O3 also connected to the wakeup input P3 of the power supply unit. The outputs WK and P3 are for example of open collector or open drain type. Thus, once the processing logic unit has been awoken, the latter can maintain its supply state as long as necessary.

Figure 2:
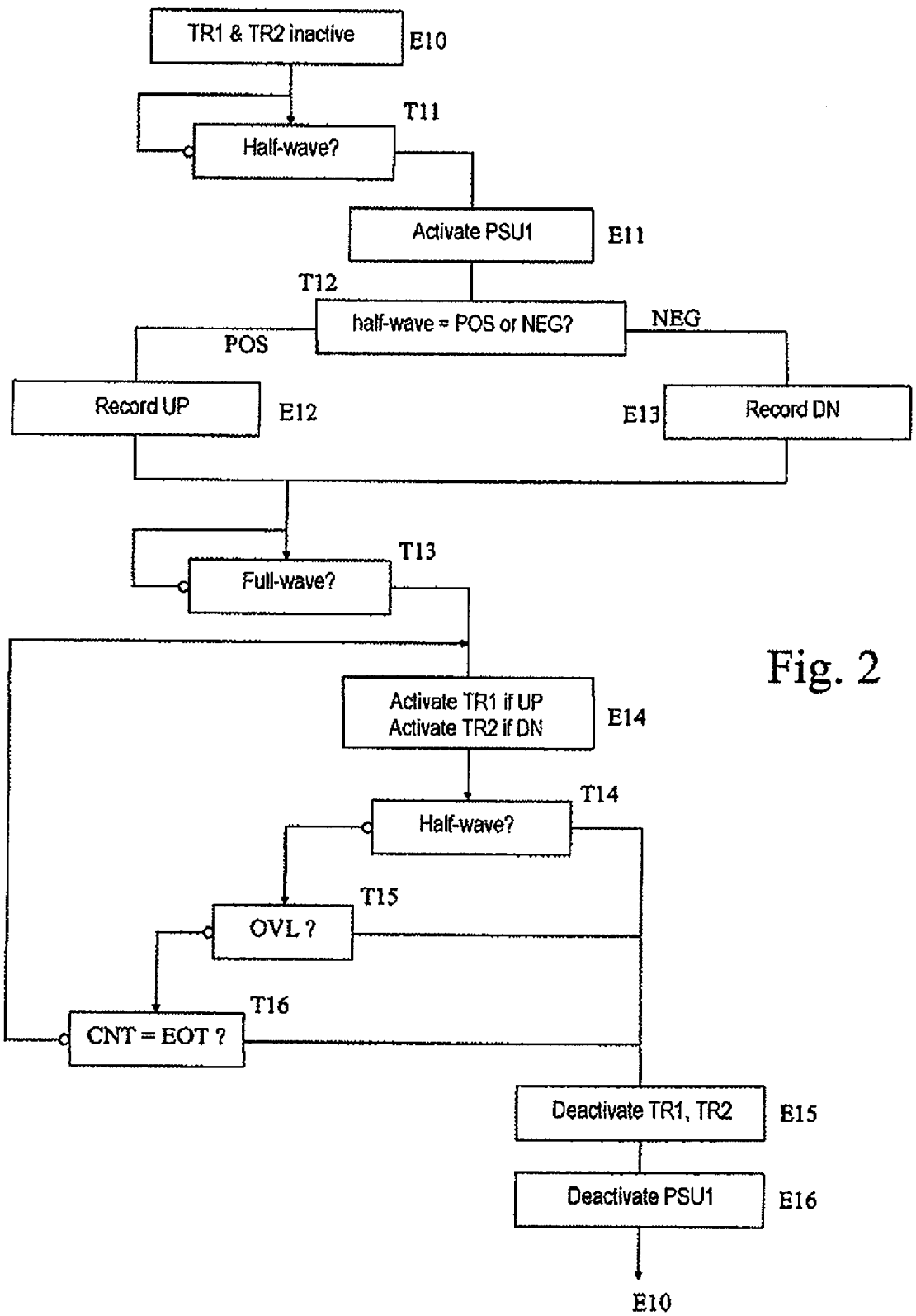
FIG. 2 is a flowchart of a mode of execution of a control method according to the invention.

FIG. 2 represents, in the form of a flowchart, a mode of execution of the method of control of the actuator according to the invention, such as it proceeds in the motor drive unit MCU.

The actuator is assumed to be supplied in a normal manner, in full voltage wave mode. The power supply unit operates at reduced power (the sub-assembly PSU0 alone is activated).

In an initial step E10, the controlled switches TR1 and TR2 are inactive.

A first test T11 detects whether a half-wave regime appears, that is to say whether a half-wave rectified signal is present on the conductor HL. If such is the case, the first step E11 is entered, if not, this first test T11 is looped around.

In step E11, there is complete activation of the power supply unit PSU (the sub-assemblies PSU0 and PSU1 are activated). The processing logic unit CPU is activated. During the second test T12, a test is carried out as to whether the remaining half-wave is positive or negative. If it is positive, a second step E12 is entered in which an indicator UP is set. If it is negative, a third step E13 is entered in which an indicator DN is set. The outputs of steps E12 and E13 lead to a third test T13 on a return to the full-wave regime.

So long as the supply voltage of the actuator has not reverted to full wave, then the test T13 loops over itself.

If the voltage reverts to full wave, then a fourth step E14 is entered in which the first, respectively the second, controlled switch is activated according to the indicator UP, respectively DN, set during steps E12 or E13. The motor is then energized and operates the load in the first or the second direction.

This power supply situation of the motor endures if the following three tests are negative:
- a fourth test T14 determines whether there is return to a half-wave regime. If there is, the disappearance of a half-wave is immediately interpreted as a stop command and a fifth step E15 is entered. If not, a fifth test T15 is entered.
- The fifth test T15 determines whether there is over-torque (end-stop reached, obstacle detected). If there is, step E15 is also entered. If not, a sixth test T16 is entered.
- The sixth test T16 determines whether the content of the counter CNT corresponds to a value EOT pre-recorded during an end-of-travel training. If it does, step E15 is also entered, if not, step E14 is looped over or, alternatively, the input of the test T14 is looped over.

During the fifth step E15, the controlled switch which was activated becomes deactivated, so as to cause the motor to stop. Then the sixth step E16 is entered in which the power supply unit reverts to reduced power by deactivating the second sub-assembly PSU1. The processing logic unit deactivates for example its third output O3, thereby placing the second sub-assembly in sleep mode and causing the positive voltage VCC to disappear.

To within the content of the counter CNT, the actuator as a whole is then in the configuration of the initial step E10. The method loops over this step.

The method is capable of numerous variants. In particular, it may turn out to be useful to confirm the half-wave regime during three successive periods of the supply voltage before setting the first indicator UP or the second indicator DN. The test T12 is then repeated three times identically before entry to steps E12 or E13 is validated.

Likewise, it is possible to make sure of the return to full wave for at least two complete periods during the test T13 before branching to step E14. It is possible merely to make sure that the signal from the remote-control unit RCU comprises a positive half-wave and a negative half-wave.

In all cases, it is characteristic of the invention that the full-wave regime must be restored before energizing the motor. Moreover, thereafter a return to a half-wave regime is sufficient to cause the energizing of the motor to stop, whatever the nature of this half-wave regime.

Preferably, the disappearance of a single half-wave is sufficient to cause the controlled switch to open. Prolonged pressing of a switch engenders a control signal consisting of a half-wave rectified signal, that is to say a redundancy of stop commands when the motor is energized. This permits the maneuver stop function to be made safe.

Variants of the embodiment of the motor drive unit MCU are also possible. In particular, the command interpretation unit CIU can be replaced with a simple wakeup unit WKU, having only the half-wave information input POS/NEG and a wakeup output WK. The interpretation of the controls is then performed totally by the processing logic unit CPU whose inputs I1 and I2 then become linked to the current sensors of the first sub-assembly PSU0.

In a variant, the motor drive unit MCU contains a command interpretation unit CIU capable of also discriminating an intermediate position control IP.

In this variant of the installation, a capacitor CIP is disposed in the remote-control unit RCU between the input connected to the phase lead and the output connected to the actuator by the phase link HL, therefore to the terminals of the two switches mounted in series.

If a pulse takes place on one of the two normally closed switches, then the actuator is energized through the capacitor CIP, which therefore creates a voltage divider arrangement with at least the input resistor of the power supply unit PSU during a half-period.

In this case, the voltage across the terminals of the actuator is not zero but reduced, for example equal to a third of the nominal value.

A signal comprising a voltage half-period equal to the nominal voltage and a reduced voltage half-period continues to be regarded as a half-wave rectified signal, thereby leading to the same manner of operation as previously.

The detection of a reduced voltage during positive half-period(s) or during negative half-period(s) will be interpreted as a move command if the motor has stopped, and as a stop command if the motor is moving.

On the other hand, if a full reduced voltage wave is detected, or if several periods of full reduced voltage wave are detected, although the motor has stopped, this being caused by the simultaneous pressing of the two switches, then the command interpretation unit deduces therefrom that the command is one to go to a predefined intermediate position.

If no intermediate position has been stored beforehand, the command interpretation unit deduces therefrom that the command is one to store the current position of the actuator as being the predefined intermediate position.

Finally, the motor can be of DC type, supplemented with an arrangement such as described from line 4 page 25 to line 16 page 26 with reference to FIG. 12 in patent application WO 2004/025867.

With respect to this document, the installation according to the invention moreover exhibits increased operating security through the introduction of an alternating voltage monitoring and shaping unit GCU whose manner of operation is now described with reference to FIGS. 3 to 7.

Figure 3:
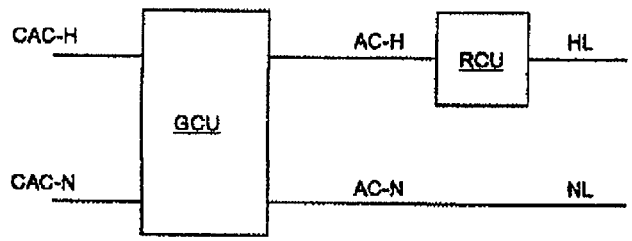
FIG. 3 is a diagram of an installation furnished with an alternating voltage monitoring and shaping module.

FIG. 3 represents the remote-control unit RCU of the installation of FIG. 1 and its link with the alternating voltage monitoring and shaping unit GCU. The actuator of the installation is not represented. It would be connected to the two electrical lines referenced HL and NL on the right of the figure, that is to say "downstream".

The alternating voltage monitoring and shaping unit GCU is preferably disposed in the electrical board of the building. It is supplied, "upstream", by the commercial electrical network whose phase line is referenced CAC-H, and whose neutral line is referenced CAC-N, while the phase line and the neutral line running round the building on output from the board are simply referenced AC-H and AC-N.

As explained in document WO 2004/025867, several remote-control units RCU and several actuators ACT can be controlled by the alternating voltage monitoring and shaping unit, when the latter has a general control module GCM.

Figure 4:
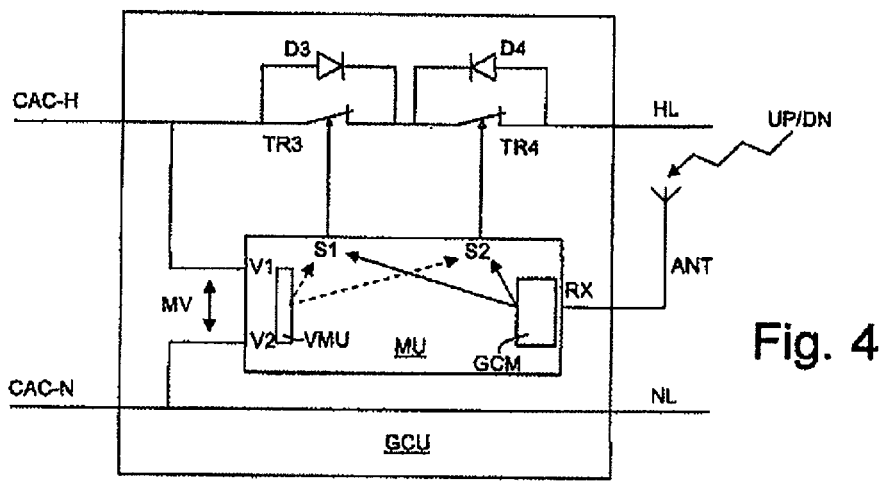
FIG. 4 is a diagram of an embodiment of an alternating voltage monitoring and shaping module.

FIG. 4 represents the detail of an alternating voltage monitoring and shaping unit GCU furnished with such a module. The monitoring unit comprises a unit MU for measuring voltage and for driving switches through its two outputs S1 and S2.

The outputs S1 and S2 are connected to the control inputs of a first opening-type controlled switch TR3 and of a second opening-type controlled switch TR4, playing a similar role to the switches SW1 and SW2 included in the remote-control unit RCU previously described. The opening-type controlled switches TR3 and TR4 are likewise connected in series, and comprise anti-parallel diodes D3 and D4 whose anodes are connected to the common point of the opening-type controlled switches TR3 and TR4.

Alternatively, a triac replaces the opening-type controlled switches and the diodes. The triac is then controlled so as to allow through a full wave, or simply the positive half-waves, or simply the negative half-waves, in a manner strictly equivalent to the assembly of the opening-type controlled switches TR3 and TR4 and anti-parallel diodes D3 and D4.

The voltage measurement and drive unit MU comprises a general control module GCM consisting of a radioelectric-wave receiver which is connected to an antenna ANT by an input RX. Depending on whether the command received by the radioelectric-wave receiver is an up command UP or down command DN, there is activation of the output S1 or of the output S2, as symbolized by two solid arrows, from the general control module GCM.

The voltage measurement and drive unit MU moreover comprises a module VMU for measuring the voltage of the network. Two voltage monitoring terminals denoted V1 and V2 are connected to the phase line of the commercial network CAC-H, and to the neutral line of the commercial network CAC-N. The voltage of the commercial network MV is thus measured by the module VMU for measuring the voltage of the network.

It is indeed important to prevent an accidental or fraudulent cutoff of a half-wave from being able to cause an undesired maneuver of the load. This is particularly important if the load LD operated by the actuator is a door or a roller blind.

For this purpose, the voltage monitoring module is also connected to the outputs S1 and S2, as symbolized by two dashed arrows.

Figure 5:
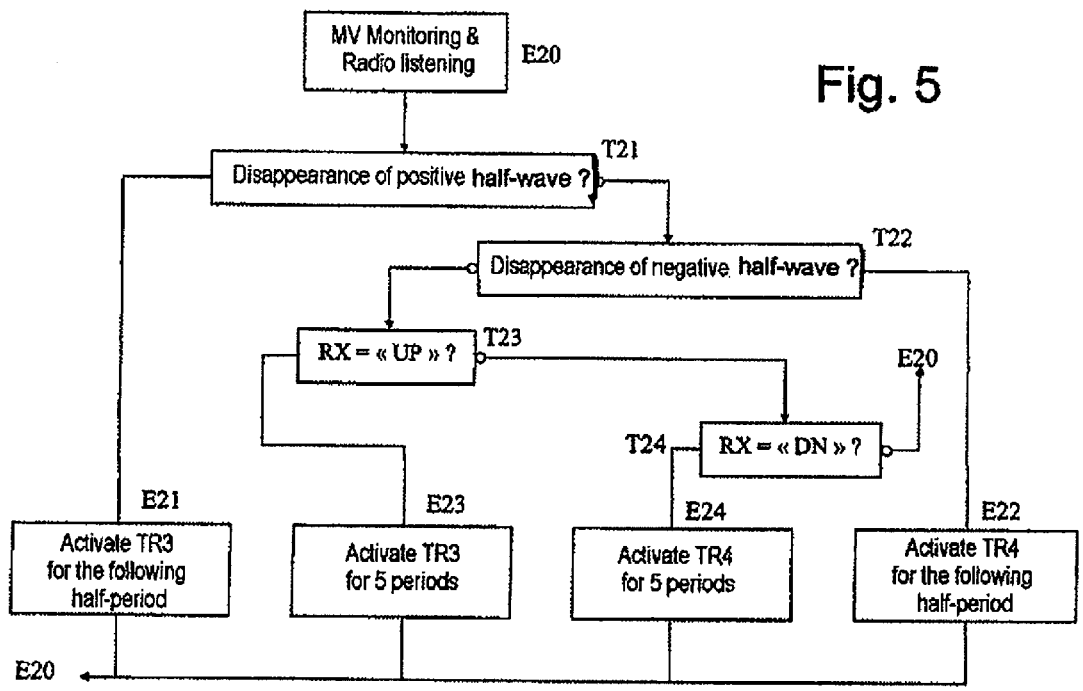
FIG. 5 is a flowchart of a mode of execution of an alternating voltage monitoring and shaping method.

FIG. 5 describes a mode of execution of the monitoring method implemented in the alternating voltage monitoring and shaping unit GCU. In an initial step E20 in which the module for monitoring the voltage of the network "upstream" and the radioelectric-wave receiver are activated. A first test T21 is then entered in which a test is carried out as to whether there is disappearance of a positive alternation in the voltage delivered by the commercial network. If there is, a first step E21 is entered in which the output S1 is activated on the half-period immediately following the missing alternation, this having the effect of opening the switch TR3 and therefore of also making the negative alternation disappear. Thus, "downstream", the signal transmitted cannot be interpreted as a maneuver command.

If the test T21 gives a negative result, a second test T22 of disappearance of a negative alternation is carried out. If this time a negative alternation is missing in the "upstream" voltage, a second step E22 is entered which consists in activating the output S2 to cause the switch TR4 to open throughout the half-period following the missing alternation. Again, it is therefore automatically a complete period of the voltage which disappears "downstream". The monitoring system maintains the distribution of a voltage of zero mean value, in the absence of intentional and authorized command.

If the second test T22 gives a negative result, it is because the "upstream" alternating voltage is complete. Henceforth, it is also appropriate to analyze the general-control commands received by radioelectric waves, and to transmit them by wire. A third test T23 is then carried out which tests whether the receiver has received an up command UP. If it has, a third step E23 is entered in which the output S1 is activated for 5 periods, thereby opening the switch TR3 and bringing about the transmission of just the positive half-waves for this duration. "Downstream", this command is interpreted as an up command maneuver and causes the motor or motors to be powered in the corresponding direction, as soon as there is a return to a full-wave power supply.

If the radioelectric-wave receiver has not received an open command, a fourth test T24 is carried out to determine whether it has received a down maneuver command DN. If it has, a fourth step E24 is entered in which the output S2 is activated for 5 periods, thereby opening the switch TR4 and bringing about the transmission of just the negative half-waves for this duration. "Downstream", this command is interpreted as a down maneuver command DN and causes the motor or motors to be powered in the corresponding direction, as soon as there is a return to a full-wave power supply.

On completion of each of the four steps of the method, the latter loops over the initial step E20.

An important advantage of the invention is that it makes it possible to transmit a programming signal, for example to enter a mode of adjustment and/or training of particular positions.

Thus, a calibrated duration of a half-wave signal is interpreted as a signal storing an upper end-of-travel if the signal is of positive polarity, and as a signal storing a lower end-of-travel if the signal is of negative polarity. A calibrated duration lies for example between 15 and 20 seconds.

With reference to FIG. 2, an additional test can be inserted upon positive output of the test T13, before step E14. This test verifies whether the current value of a time counter lies between 15 seconds and 20 seconds. If such is not the case, the method continues with step E14. If such is the case, a mode of training and reading the value of current position of the load, contained in the counter CNT, is entered. The value of this counter is assigned to a top end-of-travel memory if the indicator UP has been activated in step E12, and it is assigned to a bottom end-of-travel memory if the indicator DN has been activated in step E13.

The time counter TIM is reset to zero after its value is assigned to a memory. This counter is activated during step E11.

As a security measure, the ergonomics of storage and/or entry to an adjustment mode can be rendered more complex and require several successive actions of calibrated duration.

The invention claimed is

1. A method of controlling an electromechanical actuator (ACT) comprising a motor (MOT) for maneuvering a mobile appliance (LD) of a building in a first direction (DIR1) and in a second direction (DIR2) by way of a remote-control unit (RCU) and a unit (MCU) for driving the motor that are placed respectively one upstream of the other on an electrical power line energizing the motor with an alternating voltage, a command to maneuver in the first direction comprising a half-wave rectified signal of positive polarity and a command to maneuver in the second direction comprising a half-wave rectified signal of negative polarity, wherein the maneuver commands furthermore comprise an alternating voltage signal following the half-wave rectified.

2. The control method as claimed in claim 1, wherein the maneuver commands comprise a half-wave rectified signal in which at least five alternations of like sign of the alternating voltage have been cut off.

3. The control method as claimed in claim 1, wherein a stop command comprises a half-wave rectified signal, whatever the polarity of the signal is.

4. The control method as claimed in claim 1, wherein electronic circuits (PSU1, CPU, TCU) for managing the power supply to the motor are activated as soon as a half-wave rectified signal is detected.

5. The control method as claimed in claim 4, wherein the electronic circuits (PSU1, CPU, TCU) for managing the power supply to the motor are deactivated as soon as a stop order is executed.

6. The control method as claimed in claim 1, wherein a half-wave rectified signal comprises a voltage half-period equal to the nominal voltage and a reduced voltage half-period.

7. The control method as claimed in claim 6, wherein a complete period, or a succession of complete periods, of reduced voltage is interpreted as a command to maneuver the mobile appliance (LD) towards a predefined intermediate position if the motor has stopped.

8. An actuator (ACT) for maneuvering a mobile appliance (LD) of a building in a first direction (DIR1) and in a second direction (DIR2), comprising a unit (MCU) for driving a motor and a motor (MOT), wherein it comprises hardware means (PSU0, CIU, TCU) and software for implementing the method according to claim 1.

9. An installation (INST) comprising an actuator (ACT) as claimed in claim 8 and a remote-control unit (RCU) comprising two normally closed switches (SW1, SW2) mounted in series and two diodes (D1, D2) mounted in parallel with the switches, two electrodes of like nature of the diodes being linked to the common terminal of the switches.

10. The installation as claimed in claim 9, wherein the remote-control unit (RCU) comprises a capacitor (CIP) disposed across the terminals of the assembly of the two switches mounted in series.

11. The installation (INST) as claimed in claim 9, wherein it comprises a voltage monitoring and voltage shaping unit (GCU) to monitor the presence of the alternations of an alternating voltage and, when a first alternation is absent, to remove the alternation immediately following the first alternation.

12. The installation as claimed in claim 11, wherein the voltage monitoring and voltage shaping unit (GCU) comprises a voltage measurement module (VMU), two normally closed controlled switches (TR3, TR4) mounted in series and two diodes (D3, D4) mounted in parallel with the switches, two electrodes of like nature of the diodes being linked to the common terminal of the switches and a unit (MU) to control the switches as a function of the voltage measured by the voltage measurement module.

* * * * *